United States Patent Office 2,717,435
Patented Sept. 13, 1955

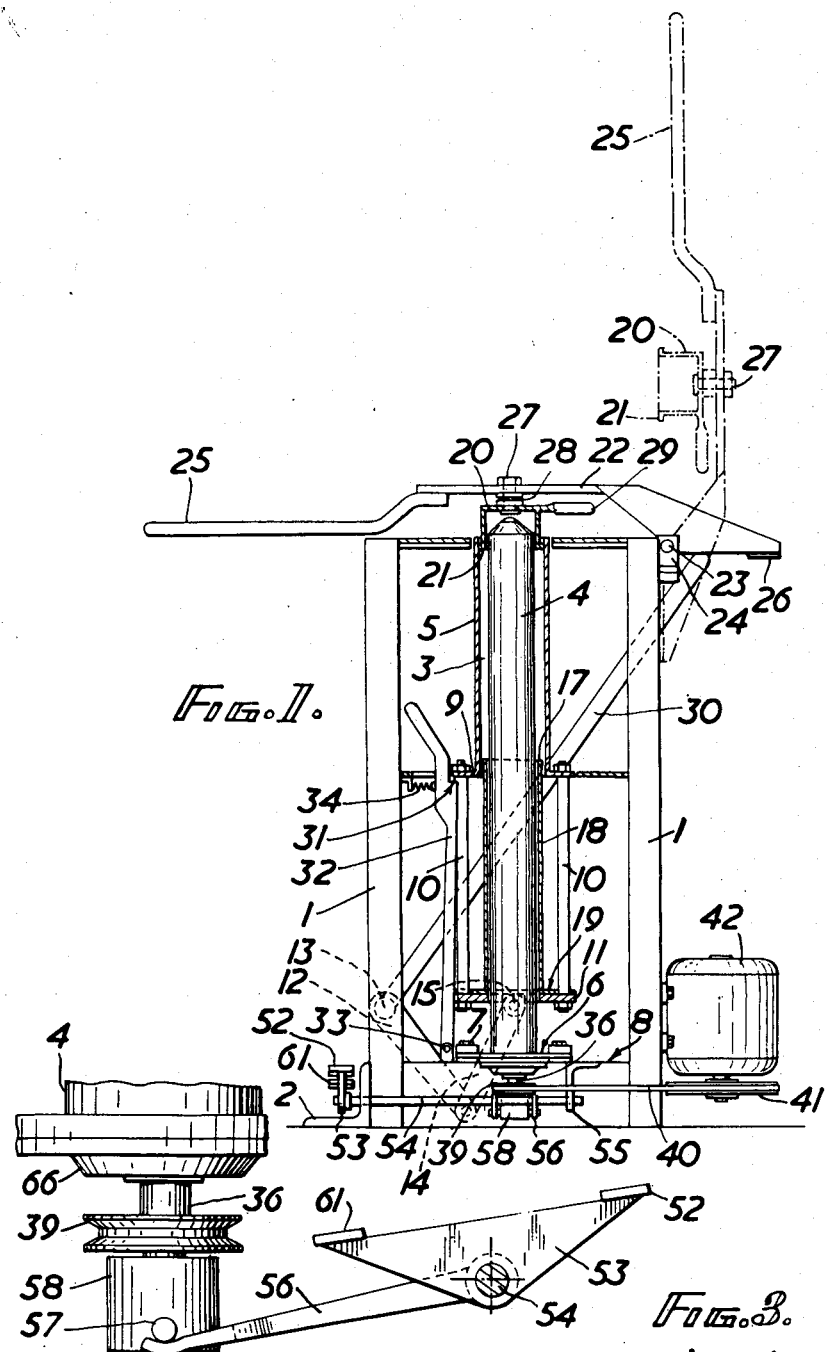

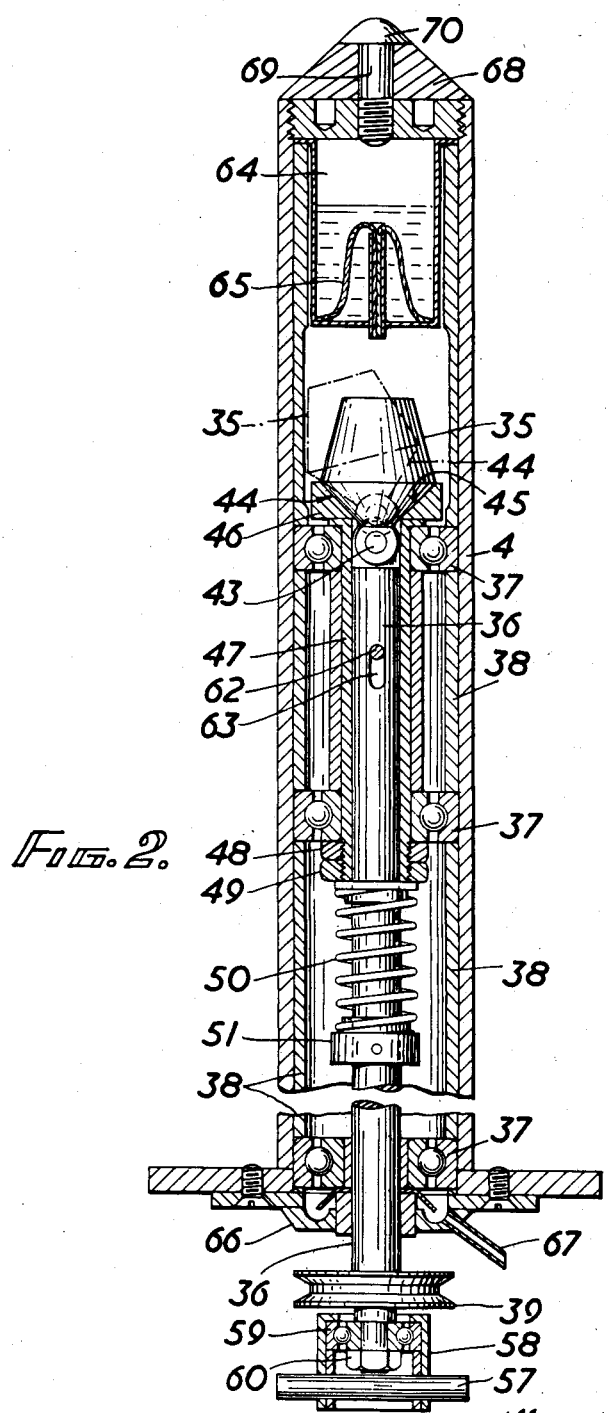

2,717,435

MACHINE FOR MOULDING PIPES, TUBES, AND THE LIKE FROM CEMENTITIOUS MIXES

William David Livingston and Ronald Frank King, Thatcham, England, assignors, by mesne assignments, to Listone Concrete Company Limited, Nairobi, Kenya, a corporation of Kenya Application November 30, 1951, Serial No. 259,031

Claims priority, application Great Britain December 6, 1950

8 Claims. (Cl. 25—30)

The present invention relates to a machine for moulding pipes or tubes from cementitions mix such as a mixture of cement and aggregate the pipes, tubes or the like being formed by packing the cement mix into a mould the dimensions of which correspond to the size of the finished article, consolidating the mix in the mould and finally removing the moulded pipe, tube or the like from the machine so that the same may be stored for setting.

The object of the present invention is to provide a machine which will satisfactorily mould pipes, tubes or the like articles from a cement mix of low water content, producing a high quality concrete article, readily handled from the mould, thereby reducing the time required for setting with the consequence of an increased rate of production.

A further object of the present invention is to provide a machine which is simple in construction and of relatively low cost in manufacture and also in which the removal of the articles from the mould is readily effected so that the possibility of damage to the same is effectively reduced.

According to the present invention a machine for moulding pipes, tubes or the like from a concrete mix is provided wherein the mix is fed into a mould and subjected to pressure and vibration to consolidate the same into the required moulded shape.

According to a further aspect of the present invention a machine for moulding pipes, tubes or the like from a concrete mix comprises a core member and an outer casing surrounding the core member, an annular space between the core member and the outer casing to form the moulding space and into which the concrete mix is fed said annular space having a closed and an open end, means for vibrating the core member and means for applying, through the open end of the annular space, pressure to the mix to consolidate the same during the vibration phase, the removal of a moulded pipe from the machine being effected by means operable to effect relative movement between the core member and the outer casing.

Preferably the removal of a moulded pipe from the mould is effected by firstly moving the moulded pipe and the outer surrounding casing in a longitudinal direction relative to the core member to strip the moulded pipe from the said core member and secondly to move the outer casing in the opposite longitudinal direction to withdraw the same from around the moulded pipe.

The vibrator may be arranged internally of the core member and may consist, for example, of a weight rotatably mounted within the bore of the core member said weight being movable longitudinally within said bore to a position wherein its longitudinal axis lies at an angle to the axis of the core member so that the same operates to vibrate the core member, longitudinal movement of the weight in the opposite direction causing the same to move to a position where its axis is in alignment with the axis of the core member to stop vibration of said core member.

The vibrator may, for example, be of the type disclosed and claimed in the specification of our co-pending application Serial No. 259,032 filed November 30, 1951, now Patent No. 2,679,384.

In order that the invention may clearly be understood and carried into effect an embodiment of a manually operated machine will now be described with reference to the accompanying diagrammatic drawings in which:

Figure 1 is a side elevation of the machine showing partly in section the mould and Figure 2 is a sectional view, to an enlarged scale, of the core member incorporating a vibrator of the type disclosed in the specification of our copending application No. 259,032.

Figure 3 is a fragmentary view of a suitable mechanism for controlling the vibrator.

In the construction shown diagrammatically in the drawings the machine comprises a supporting framework consisting of vertical members 1 of T section or other suitable angle iron connected together at their lower ends by side members 2 of L section angle iron and which are arranged to form a base for the support of the framework.

The mould is formed by an annular space 3 the dimensions of which correspond to the size of the pipes to be molded, and such space is formed between an inner core member 4 and an outer surrounding casing 5, the longitudinal axis of these two members being arranged vertically and disposed centrally of the machine framework.

The core member is provided at its lower end with a flange 6 by means of which the same is secured by bolts 7 to a base plate 8 which is welded to the vertical members 1 of the framework adjacent the lower ends of the same.

The outer casing 5 is provided at its lower end with a surrounding flange 9 which is connected by means of the stay rods 10 to a plate 11. The outer casing assembly above described is supported by an arm 12 one end of which is secured to a shaft 13 mounted between two of the vertical members 1 of the framework. The free end of the arm 12 is pivotally connected to one end of a link 14 the opposite end of the link being pivotally attached by a pivot pin 15 to the underside of the plate 11, the pivot pin being mounted in lugs 16 depending from the underside of the plate 11.

The lower end of the annular space 3 is closed by a ring 17 formed on the upper end of a sleeve 18 the lower end of the sleeve having a flange 19 which rests upon the upper surface of the plate 11.

The concrete mix is filled into the annular space 3 through the open upper end and preferably a filling chute, not shown, is provided for this purpose, the said chute being connected to a hopper, also not shown, containing a supply of the mix, the chute being adapted to be moved into and out of register with the open end of the annular mould space 3.

As the mix is fed into the mould the vibration is applied, thus consolidating the material and when the required quantity of the mix has been supplied the open end of the annular space is closed by a closure member through which pressure may be applied to the mix the mix being simultaneously subjected to vibration, the combined action of pressure and vibratory motion effecting final consolidation of the mix during the moulding operation.

As shown the closure member consists of a cover 20 having a peripheral flange 21 which is adapted to enter the open end of the annular space 3 the peripheral flange being adapted to be forced down onto the mix to assist in consolidating the mix during moulding.

For this purpose the cover 20 is secured to an arm 22 carried by a pivot pin 23 mounted in spaced bearings 24 carried by the vertical members 1 at one side of the machine, the arm extending across the machine and being provided at its other end with an extension 25 forming a handle by means of which the arm can be pulled downwardly to exert a pressure on the mix through the cover 20.

Upon completion of a moulding operation the peripheral flange of the cover 20 is moved out of the open end of the annular space 3 by turning the arm 22 to the raised position shown in dotted lines in Fig. 1 the raising movement of the arm being limited by a stop 26 carried by the arm and which engages with the machine framework.

Preferably, and as shown, the cover 20 is carried by a spindle 27 mounted on the arm 24 a thrust bearing 28 being interposed between the arm and the cover so that the said cover may be rotated when under pressure, a handle 29, projecting radially from the cover, being provided for this purpose.

To remove a pipe from the mould upon completion of the moulding operation the arm 24 is first moved to the dotted line position shown in Fig. 1 of the drawings, the shaft 13 is then turned in an anticlockwise direction by effecting movement of the lever 30 which is secured by its lower end to the shaft.

This movement of the shaft 13 results in a swinging movement of the arm 12 to effect, through the link 14, an upward movement of the outer casing assembly above described, a similar upward movement being imparted simultaneously to the ring 17 through the sleeve 18.

As the ring 17 moves upwardly the moulded pipe is carried with it and stripped from the core member and when the ring reaches the upper limit of its travel it is engaged by a catch member 31 provided adjacent the upper end of a lever 32 which is pivotally mounted about its lower end 33, the lever being urged by a spring 34 into the ring engaging position.

When the ring 17 is maintained in the upper position by the catch member 31 the lever 30 is returned to the position shown in Fig. 1 with the result that the outer casing 5 moves downwards to its lower position surrounding the core member 4, thus the moulded pipe is free to be removed from the supporting ring. Operation of the lever 32 against the action of spring 34 withdrawing the catch 31 out of engagement with plate 19 so that the ring 17 is free to return to the lower position adjacent the lower end of the annular space 3 in readiness for the next moulding operation.

The vibratory motion of the mix during moulding, is effected by subjecting the core member 4 to the action of a vibrator which in the arrangement shown in the drawings is contained within the bore of the said core member 4.

As shown the vibrator is of the type disclosed in the specification of our co-pending application No. 259,032 and consists of a weight 35 which is carried by the upper end of a shaft 36 arranged within the bore of the core member 4. The shaft is rotatably mounted within spaced bearings 37 also mounted within the bore of the core member, the bearings being maintained in spaced relationship with one another by tubular distance pieces 38.

The lower end of shaft 36 projects out of the lower end of the bore of the core member 4 and is provided with a grooved pulley 39 which is connected by a driving band 40 to the driving pulley 41 mounted on the output shaft of an electric motor 42 which is located on the framework of the machine.

To interrupt vibration the weight 35 is held in a position in which its axis is in alignment with the axis of the core as shown in full lines in Fig. 2 and is capable of being turned out of this position to the position shown by the dotted lines for vibration.

For the above purpose the weight 35 is mounted on a pivot pin 43 carried by the upper end of the shaft 36 and is capable of being turned about this pivot pin by imparting longitudinal movement to the shaft 36, in a downward direction to interrupt vibration and in the opposite direction to permit vibration.

The longitudinal downward movement of the shaft 36 causes a conical surface 44 on the weight 35 to engage with a co-acting conical surface 45 formed in a bush 46 carried on the upper end of a sleeve 47 surrounding the shaft 36. This sleeve extends downwardly through the intermediate bearing 37 and is secured in position by a retaining nut 48 which is tightened up onto the underside of the inner race of this intermediate bearing and is locked in position by a lock nut 49, the downward movement of the shaft 36 being effected by a compression spring 50 surrounding the shaft the spring being compressible between the lock nut 49 and a bush 51 pinned to the shaft 36.

The weight 35 is thus normally held with its axis in line with the axis of the core member and accordingly upon starting the electric motor 42 smooth and vibrationless running is obtained.

To start vibration the shaft 36 is moved upwardly against the action of spring 50 and this is effected by depressing the pad 52 of a foot pedal 53 which is mounted intermediate its length on one end of a shaft 54 rotatably mounted in spaced bearings carried respectively by one of the foot members 2 of the machine frame and a bracket 55 secured to the machine frame.

The rotational movement imparted to the shaft 54 results in upward movement of the free ends of the arms of a fork 56 carried by shaft 54, the said free ends engaging with a cross bar 57 carried by a housing 58, the upward movement of the housing being transmitted to the shaft 36 through a bearing 59 secured to the lower end of the shaft 36 by a retaining nut 60, with the result that the weight 35 falls out of centre where it is held on the rim of the conical seating 45 by centrifugal force.

To stop vibration the shaft 54 is rotated in the opposite direction by depressing pad 61 of the foot pedal 53 thereby imparting a downward movement to the shaft 36 whereupon the weight 35 is drawn back into the conical seating 45.

Upon stopping the electric motor 42, even with the weight 35 in the vibrating position, as the revolutions drop and centrifugal force decreases, the weight 35 is automatically returned to the non-vibrating position by the loading of spring 50, thus ensuring that the motor 42 cannot be restarted with the weight in the vibrating position. Accordingly starting power is reduced and low speed vibrations which are damaging to the machine structure are avoided. The longitudinal movements of the shaft 36 are limited in both directions by a transverse pin 62 which passes through a slot 63 formed in the shaft 36.

As it is necessary to operate the electric motor 42 at high speed it is preferable that the same should operate continuously whilst the machine is in use and accordingly with the vibrator shown in the drawings the vibrating action can, if desired, be interrupted at the termination of a moulding operation and restarted again without the necessity of stopping the electric motor or disconnecting the shaft 36 from the same.

Drip lubrication of the vibrator is obtained from an oil pot 64 screwed into the upper end of the bore of the core member 4 the lubricating oil from the oil pot being fed by a wick 65 to the bore of the core member. The oil after its passage down through the bore is collected in a sump 66 provided at the lower end of the core member and from which it is delivered through a drain pipe 67 to a suitable reservoir, not shown.

To prevent the access of cement dust, grit or dirt to the bore of the core member the upper end of the same is closed by a cover cap 68 of conical shape and which is secured in position by a screw 69 having a domed head 70 the surface of which fairs into the conical shape of the cover cap, the conical shape of the cover cap thus assisting in guiding the cement mix from the outlet of the feed chute into the annular space.

What we claim is:

1. A machine for moulding concrete pipes, tubes and like tubular objects comprising a vibratable stationary core member, an outer casing surrounding said core member and spaced therefrom to establish an annular moulding space for receiving the moulding mix, means for displacing said casing together with the moulded object longitudinally in one direction in relation to said stationary core member to strip the object from said stationary core member, means retaining the moulded object in said displaced position stripped from said core member, and means for thereafter displacing said casing longitudinally in the opposite direction thereby to strip said casing from the moulded object.

2. A moulding machine as defined in claim 1 wherein said means for displacing the moulded object comprises an annular closure member for one end of said annular moulding space, said closure member also constituting part of the means for retaining the moulded object in said displaced position stripped from said core member.

3. A moulding machine as defined in claim 2 wherein said closure member for stripping the moulded object from said core member is constituted by a ring at one end of a sleeve surrounding said core member, said sleeve being provided at its other end with a flange, and said means for retaining the moulded object in said displaced position includes releasable catch means engageable with said flange.

4. A moulding machine as defined in claim 1 and which further includes a removable closure cap for one end of said annular moulding space, said closure cap having a flanged part adapted to enter said annular space, said closure cap being carried by a lever device by which pressure from said flanged part can be applied to the moulding mix within said annular space while said core member is vibrated, said lever device also being movable to a position wherein said closure cap is removed from said annular space to permit removal of the moulded object from said machine.

5. A machine for moulding concrete pipes, tubes and like tubular objects comprising an upright frame, a vibratable stationary core member supported vertically in said frame, an outer casing surrounding the upper portion of said core member and spaced therefrom to establish an annular moulding space therebetween, a sleeve surrounding the lower portion of said core member and having a ring at its upper end disposed between the lower end of said casing and core member to establish a closure for the lower end of said annular moulding space, means for simultaneously raising said casing and sleeve upwardly above the upper end of said stationary core member thereby to raise and strip the moulded object from said core member, releasable means retaining said sleeve in said raised position, and means for lowering said casing with said sleeve and moulded object in said raised position thereby to strip said casing from the moulded object.

6. A machine for moulding concrete pipes, tubes and like tubular objects comprising an upright frame, a vibratable stationary core member supported vertically in said frame, an outer casing surrounding the upper portion of said core member and spaced therefrom to establish an annular moulding space therebetween, means for raising and lowering said casing relative to said stationary core member, a sleeve surrounding the lower portion of said core member and having a ring at its upper end disposed between the lower end of said casing and core member to establish a closure for the lower end of said annular moulding space, means on said sleeve engageable with said means for raising said casing so as to cause said sleeve to be raised with said casing thereby to raise and strip the moulded object from said stationary core member, and releasable means retaining said sleeve and hence also the moulded object in said raised position whereby to cause the moulded object to be stripped from said casing upon lowering of said casing.

7. A moulding machine as defined in claim 6 wherein the means engaging said sleeve and the said means for raising said casing is constituted by a flange at the lower end of said sleeve.

8. A moulding machine as defined in claim 7 wherein said releasable means retaining said sleeve in said raised position is constituted by a latch member engageable with the flange at the lower end of said sleeve.

References Cited in the file of this patent

UNITED STATES PATENTS

| | | |
|---|---|---|
| 1,399,325 | Straub | Dec. 6, 1921 |
| 1,472,399 | Pettengill | Oct. 30, 1923 |
| 1,473,969 | Nichols | Nov. 13, 1923 |
| 1,899,115 | Schultz | Feb. 28, 1933 |
| 2,524,676 | Nielsen | Oct. 3, 1950 |
| 2,544,453 | Gaudin | Mar. 6, 1951 |

FOREIGN PATENTS

| | | |
|---|---|---|
| 174,023 | Switzerland | Mar. 16, 1935 |